(12) United States Patent
Takahashi et al.

(10) Patent No.: US 6,839,250 B2
(45) Date of Patent: Jan. 4, 2005

(54) ACTIVE EMI FILTER WITH FEED FORWARD CANCELLATION

(75) Inventors: Toshio Takahashi, Rancho Palos Verdes, CA (US); Jun Honda, El Segundo, CA (US); Brian Pelly, Tehachapi, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/336,157

(22) Filed: Jan. 3, 2003

(65) Prior Publication Data

US 2003/0128558 A1 Jul. 10, 2003

Related U.S. Application Data

(60) Provisional application No. 60/346,481, filed on Jan. 7, 2002.

(51) Int. Cl.[7] .............................. H02M 5/45; H02J 1/02

(52) U.S. Cl. ............................ 363/37; 363/39; 363/40; 327/552

(58) Field of Search .............................. 363/37, 39, 40, 363/46, 47, 48, 44, 97, 131, 132; 327/103, 104, 100, 552, 372, 551

(56) References Cited

U.S. PATENT DOCUMENTS

| | | |
|---|---|---|
| 5,414,348 A | 5/1995 | Niemann |
| 5,831,842 A | 11/1998 | Ogasawara et al. |

(List continued on next page.)

FOREIGN PATENT DOCUMENTS

| | | |
|---|---|---|
| JP | 2001-231268 | 8/2001 |

OTHER PUBLICATIONS

US 2001/0045863 A1 Patent Applicaton Publication.*

*Primary Examiner*—Rajnikant B. Patel
(74) *Attorney, Agent, or Firm*—Ostrolenk, Faber, Gerb & Soffen, LLP

(57) ABSTRACT

An active EMI filter for reducing common mode current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising: a transistor switching stage coupled across the DC bus, a current sensor coupled to the DC bus for sensing the common mode current flowing in the DC bus and proportional to the common mode current flowing in the ground return line from or to the load, the current sensor having inputs coupled to respective legs of the DC bus and an output driving the transistor switching stage, the transistor switching stage comprising two transistors driven by said output of the current sensor whereby one of said transistors is turned on by said current sensor output depending on the direction of common mode current in said DC bus, a capacitor coupling said transistor switching stage and said ground return line and wherein said current sensor and said switching stage are coupled in a feed forward arrangement whereby the switching stage is coupled across said DC bus between said rectifier and said current sensor, said capacitor providing a cancellation current to said ground return line from said transistor switching stage to substantially cancel the common mode current in said ground return line, said transistor switching stage and said current sensor having an amplitude gain of approximately unity, said current sensor comprising a current transformer having a primary connected in series with a respective leg of said DC bus, said two transistors of said transistor switching stage comprising two complementary type transistors coupled such that a corresponding main electrode of each transistor are coupled together in a common connection, another corresponding main electrode of each transistor being coupled to a respective secondary of each of said current transformer and wherein the control electrodes of said transistors are coupled to respective legs of said DC bus.

19 Claims, 9 Drawing Sheets

U.S. PATENT DOCUMENTS

| | | |
|---|---|---|
| 5,852,558 A | 12/1998 | Julian et al. |
| 5,982,648 A | 11/1999 | Wang |
| 6,151,228 A * | 11/2000 | Miyazaki et al. ............. 363/48 |
| 6,490,181 B1 | 12/2002 | Liu et al. |
| 6,636,107 B2 * | 10/2003 | Pelly ........................... 327/552 |
| 2001/0045863 A1 * | 11/2001 | Pelly |
| 2002/0171473 A1 | 11/2002 | Pelly |

* cited by examiner

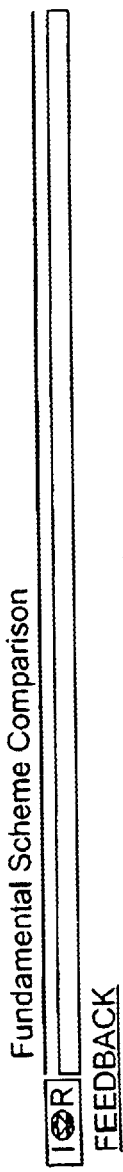
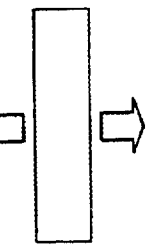
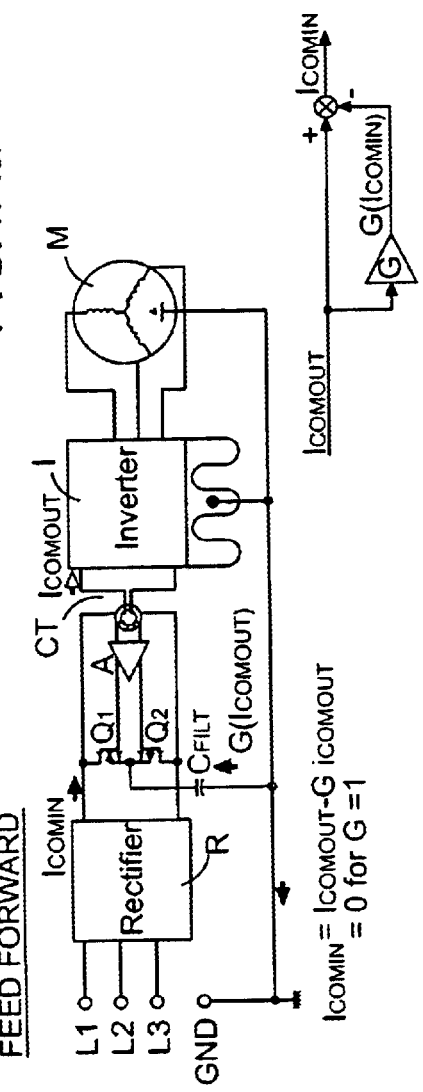

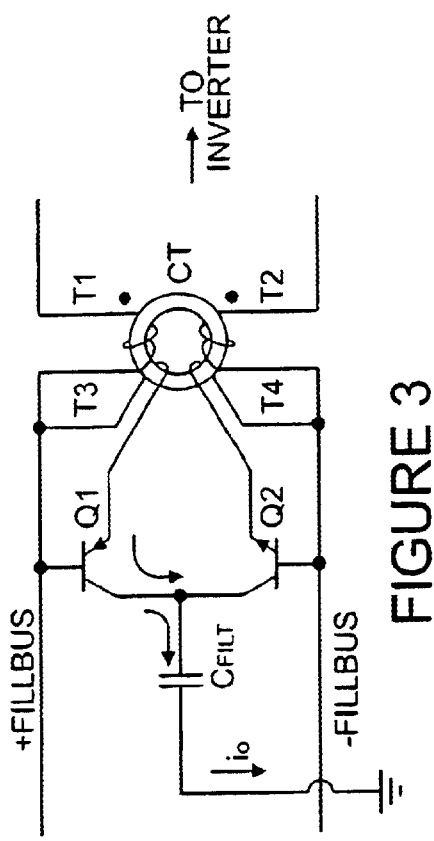
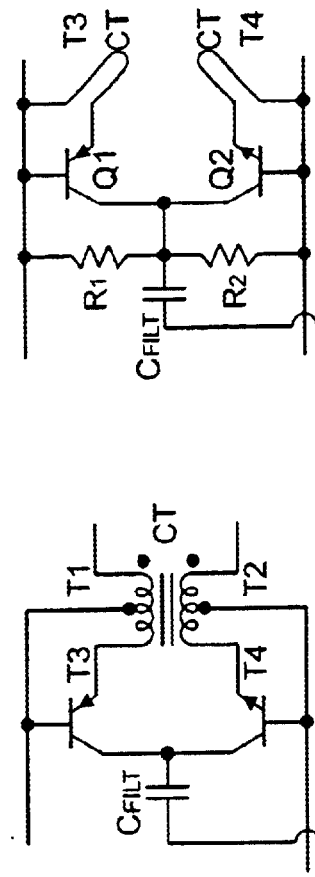
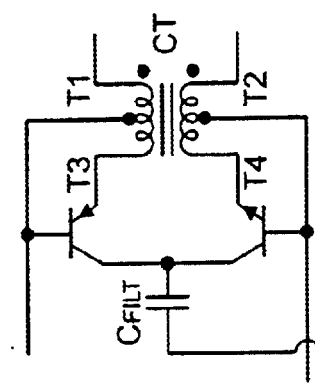
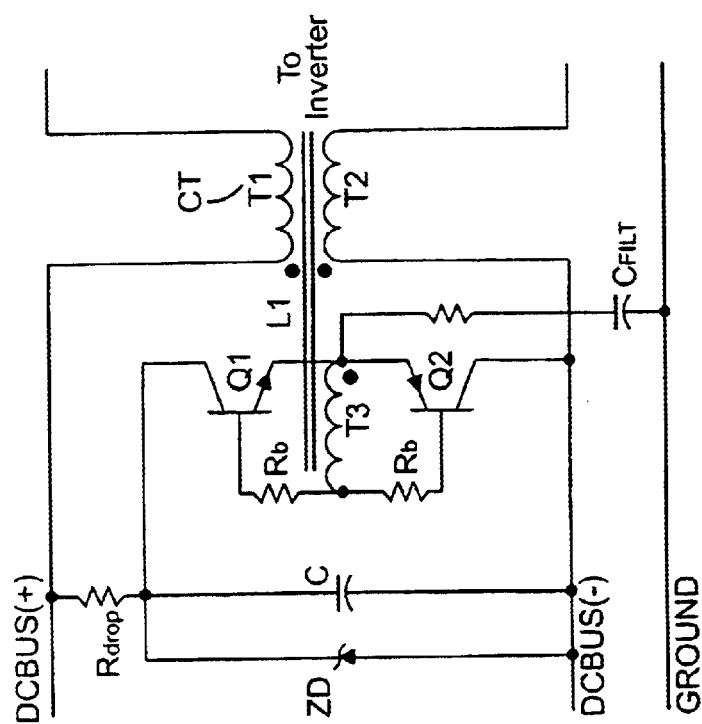
FIGURE 3
FIGURE 3A
FIGURE 3B
FIGURE 2

ACTIVE EMI FILTER WITH FEED FORWARD CANCELLATION

This application claims benefit of No. 60/346,481 filed Jan. 7, 2002.

BACKGROUND OF THE INVENTION

FIELD OF THE INVENTION

This invention relates to electrical filters and more specifically relates to an active EMI (electromagnetic interference) filter of simple circuit configuration.

Active EMI filters are known and are described, for example, in co-pending application Ser. No. 09/816,590, filed Mar. 23, 2001 entitled ACTIVE FILTER FOR REDUCTION OF COMMON MODE CURRENT, the disclosure of which is incorporated herein by reference (IR-1744).

Active EMI filter circuits may use the feed forward design as disclosed in the above noted application Ser. No. 09/816,590. The feed forward design, show in FIG. 1B, has fundamentally superior performance characteristics over the traditional feedback design, which is shown in FIG. 1A. It is desirable to reduce the part count needed for such circuits and to reduce their cost.

FIG. 1A shows the prior art feedback configuration. In the feedback configuration of the active EMI noise filter for reducing common mode current, the noise sensor may comprise, for example, a current transformer CT which has two primaries each coupled into a respective leg of the DC bus fed rectified DC current by a rectifier circuit R from the AC mains. Each primary is coupled in series with the DC bus. The DC bus is coupled to an inverter I which is controlled to provide three AC phase currents to a load, e.g., an electric motor M.

The secondary winding of the current transformer CT is coupled to an amplifier A. The common mode current is the noise current that flows in common in the same direction in both legs of the DC bus to the inverter and is caused by intrinsic reactive components (typically capacitive) between the motor windings and the motor case and/or inverter heat sink. Without filtering via capacitor $C_{FILT}$, this common mode current will be returned to the mains network ground GND and is reflected as undesirable noise currents on the AC mains. The aim of the active EMI filter circuit is to provide a path for the common mode current via capacitor $C_{FILT}$ though an active switching circuit back to the DC bus and hence contain the common mode current as a circulating current in the DC bus, inverter and motor and prevent its conduction back to the AC network. The common mode current returned to ground GND is thus cancelled.

The amplifier A outputs of FIG. 1A control two complementary transistors Q1 and Q2 to shunt common mode current through the capacitor $C_{FILT}$ from the ground line L connecting the motor case and ground. The common mode current to be minimized comprises a commonly polarized current which flows in each leg of the DC bus through the inverter to the motor M and is attributable to current flows between the windings of the motor and the motor case/inverter heat sink due to the internal intrinsic capacitances. The common mode current then flows back through the ground line and would ordinarily flow to ground. This creates unnecessary noise currents and harmonics on the AC lines. In order to minimize these currents, passive filters have been used in the past to shunt the common mode current. FIG. 1A shows a prior art active feedback filter arrangement in which the common mode current is shunted by the capacitor $C_{FILT}$ through either transistor Q1 or Q2, depending upon which transistor is turned on (which depends on the common mode current flow direction at a particular instant), back to the DC bus, thereby eliminating the common mode current returned to ground, and thereby minimizing noise currents reflected in the AC lines. However, the system shown in FIG. 1A requires a high gain of the amplifier A and current transformer in order to minimize the common mode current returned to ground. Theoretically, the gain of the system is required to be infinite to have the common mode current returned to ground equal to zero, as shown by the equations in FIG. 1A and the equivalent circuit of FIG. 1Aa. This results in possible oscillation of the system and furthermore requires a current transformer of moderate size. Furthermore, the signal to noise ratio is low, consistent with the need for the high gain amplifier.

In contrast, with the feed forward arrangement as shown in FIG. 1B, the common mode current returned to ground GND from line L is theoretically zero for a system gain equal to. Accordingly, the amplifier gain is easy to attain, the system has excellent stability and because of the high signal to noise ratio, a relatively small current transformer can be utilized. Accordingly, the feed forward design shown in FIG. 1B has significant advantages because the current transformer can be of significantly smaller size, the amplifier is easier to embody and the system has good stability and is free from oscillation.

SUMMARY OF THE INVENTION

The proposed circuits of the invention have common features: the circuits do not require an external power supply and an integrated circuit is not required. Therefore, they are all simple and low cost when compared to circuit implementations based on integrated circuits. The basic circuit structure contains only a pair of either power bipolar transistors or power MOSFETs, and a single common mode current transformer. This low cost implementation is useful for appliance/industrial motor drives and also in other power electronics application such as switched mode power supplies, UPS (uninterruptible power supplied), etc. Although an IC design is not required, the invention may be embodied by an IC design.

Features of the invention described herein are:

1. Simple active EMI filter circuits based on NPN/PNP transistors.

2. Simple active EMI filter circuits based on NPN/NPN or PNP/PNP transistors.

3. Simple active EMI filter circuits based on NMOS/PMOS MOSFETs.

4. A simple midpoint control circuit.

5. Simple bias structures for performance improvement.

6. A novel current boost method and frequency compensation method based on a current mirror circuit and a cascode circuit.

7. An N-stage multiple pole active EMI filter.

BRIEF DESCRIPTION OF THE DRAWING(S)

The invention will now be described in greater detail in the following detailed description with reference to the drawings, in which:

FIG. 1A is a circuit diagram of a feedback active EMI filter circuit.

FIG. 1Aa is an equivalent circuit.

FIG. 1B is a circuit diagram of a feed forward active EMI filter circuit.

FIG. 1Ba is the equivalent circuit.

FIG. 2 is a circuit diagram of an embodiment of the invention based on NPN/PNP transistors having a common collector amplifier connection.

FIG. 3 is a circuit diagram like that of FIG. 2 where a common base amplifier connection is used.

FIGS. 3A and 3B are variations of the circuit of FIG. 3.

DETAILED DESCRIPTION

With reference now to the drawings, the invention has a number of features, which can be categorized as described below:

1. Simple Active EMI Filter Circuits Based on NPN/PNP Transistors

A feed forward type active EMI filter circuit which is realized by two bipolar transistors, Q1 and Q2, and common mode choke coil, CT, is shown in FIG. 2. While the common mode current transformer CT is sometimes referred to as a "choke coil", the term is not intended to suggest a passive filtering component. The function of this component is to sense the common mode current and provide a signal to drive the transistors. It does not of itself provide any filtering action. There is also a differential mode noise current which comprises two currents having reverse directions in the two legs of the DC bus. Because of the connection of the two primaries, the differential mode current is cancelled.

Current transformer CT of FIG. 2 has three windings. Two of the three windings, T1 and T2, are common mode current sensing windings off the DC bus, which couples the common mode current to the third winding, T3. High frequency common mode current flows at each switching instant of the main IGBT or MOSFET devices in the inverter I. This common mode current flows, if not canceled, back to the system ground through the intrinsic capacitance coupling the inverter heatsink/motor case and a motor winding.

From winding T3, extracted common mode current flows and turns on either NPN bipolar transistor, Q1, or PNP bipolar transistor, Q2, depending on current direction. Thus Q1 and Q2 inject the same amount of opposite common mode current to the system ground through capacitor $C_{FILT}$ to essentially eliminate or cancel common mode current on the system ground.

Figure 4:
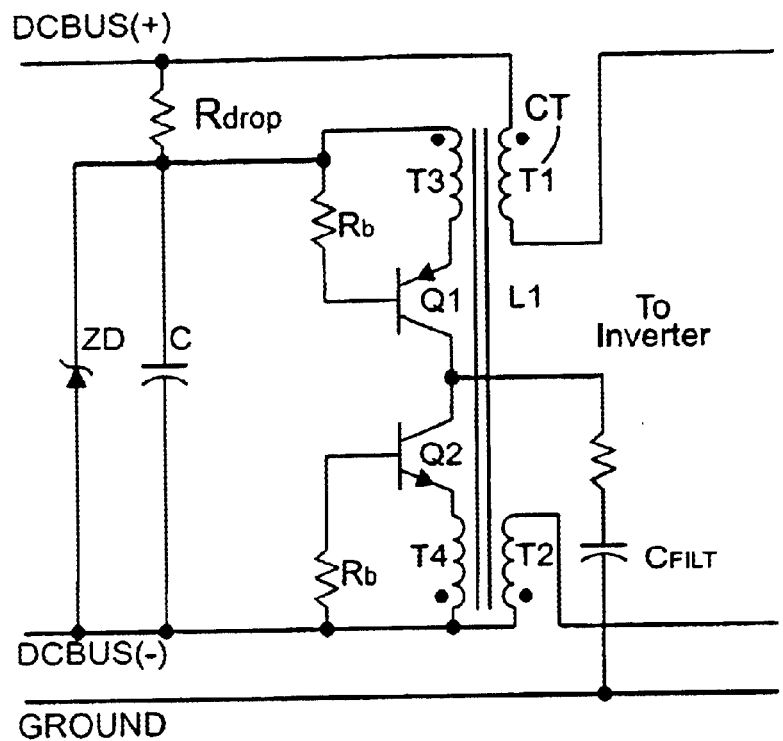
FIG. 4 is like FIG. 2 and uses a common emitter amplifier configuration.

The circuit of FIGS. 2, 3 and 4 are based on current-to-current amplifier structures which are different in terms of performance. Thus, the circuits of FIG. 2 and FIG. 4 are based on a common collector/common emitter amplifier circuits while the circuit of FIG. 3 is based on the common base amplifier connection. The difference between these connections is that the common base amplifier connection, shown in FIG. 3, has better frequency response due to no Miller capacitance effect incurred by the connections shown in FIGS. 2 and 4. This common base amplifier method also provides a low impedance input to the common mode current generated on the secondary windings, T3 and T4, while its output provides high impedance. This improves fidelity of noise current transfer characteristics to the system ground node. The difference between the circuits in FIGS. 2 and 4 is that a single secondary winding is used in the circuit of FIG. 2 while in the circuit of FIG. 4, two separate/dedicated secondary windings are used. Performance and functionality are essentially the same.

With reference again to FIG. 3, a common mode filter based upon a common base amplifier connection of transistors Q1 and Q2 is shown. The current transformer CT comprises two primaries T1 and T2 connected into the DC bus as shown and identical secondaries T3 and T4 connected respectively to the respective DC buses and the emitters of respective transistors Q1 and Q2. When common mode current flows in the DC bus, that current is coupled to secondaries T3 and T4. Depending upon the direction of current flow, either transistor Q1 or transistor Q2 is turned on. The other transistor is turned off. Q1 is a PNP transistor and Q2 is an NPN transistor in the embodiment shown. As shown in FIG. 3, transistor Q1 is shunting a common mode current signal coupled to secondary winding T3 through capacitor $C_{FILT}$ to the ground line, shown illustratably by the ground connection. The current returned to the AC line ground is reduced to zero by cancellation.

FIGS. 3A and 3B show variations of the circuit of FIG. 3 with the current transformer in FIG. 3A shown only by the two secondary windings T3 and T4. In FIG. 3A, a bias level has been applied to the common collector connections of transistors Q1 and Q2 by the resistor divider comprising R1 and R2. If R1=R2, they provide a mid-point control to equalize the current gain of each of the transistors Q1 and Q2.

In FIG. 3B, a center-tap connection for each primary/secondary has been provided but the circuit otherwise operates the same as shown in FIG. 3.

2. Simple Active EMI Filter Circuits Based on NPN/NPN or PNP/PNP Transistors

Figure 7:
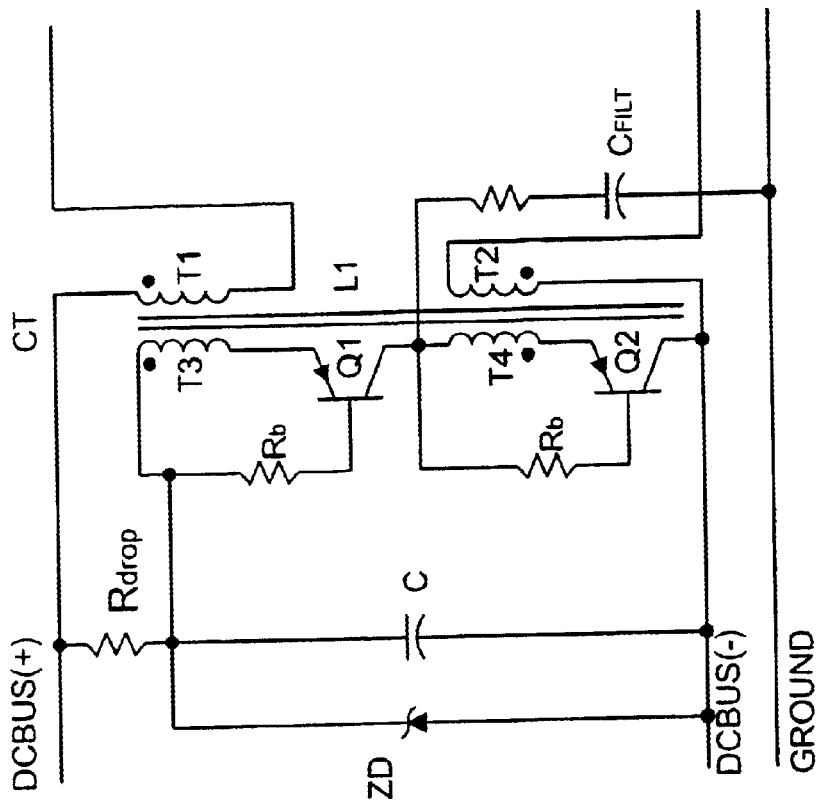
FIG. 7 shows the filter circuit of the invention employing PNP/PNP transistors.
Figure 6:
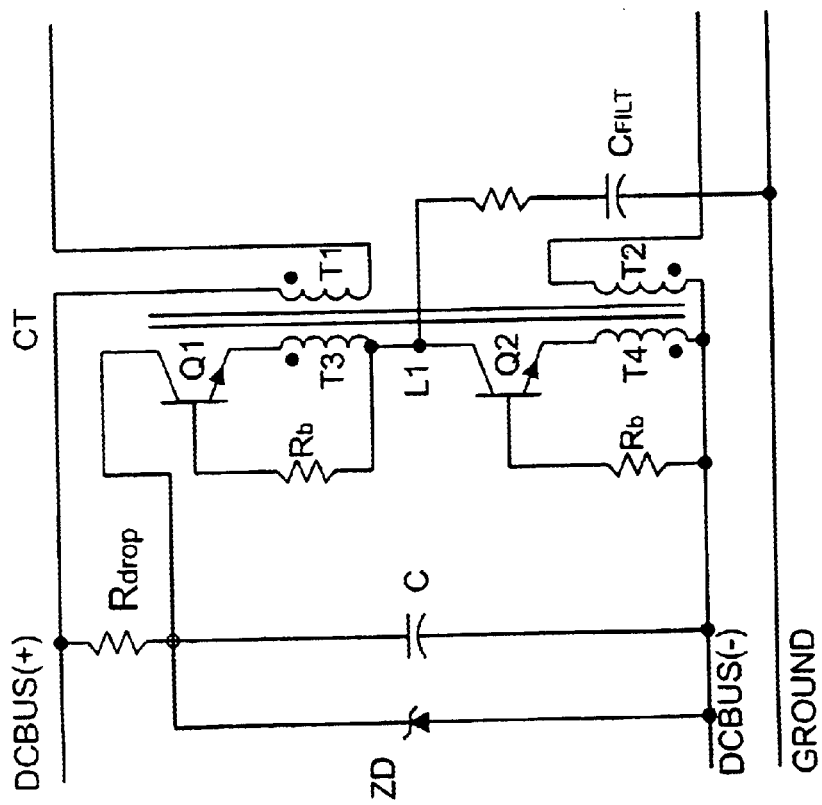
FIG. 6 shows the filter circuit of the invention employing NPN/NPN transistors.

In FIGS. 6 and 7, the basic functions are identical to those presented in the previously described circuits based on the NPN/PNP transistors. The difference is the practical usage of either NPN or PNP transistors due to lack of availability of certain transistor pairs. FIG. 6 shows an NPN/NPN transistor based active EMI filter circuit (common collector amplifier connection) while FIG. 7 is a PNP/PNP transistor based scheme (common emitter amplifier connection). The drawback, when compared with those of NPN/PNP transistor schemes, is that the NPN/NPN or PNP/PNP circuits always require two secondary windings (T3 and T4) of the common mode choke coil, unlike the circuit based on a complementary pair of transistors, which can function with a single secondary T3, as shown in FIG. 2.

3. Simple Active EMI Filter Based on NMOS/PMOS MOSFETs

Figure 16:
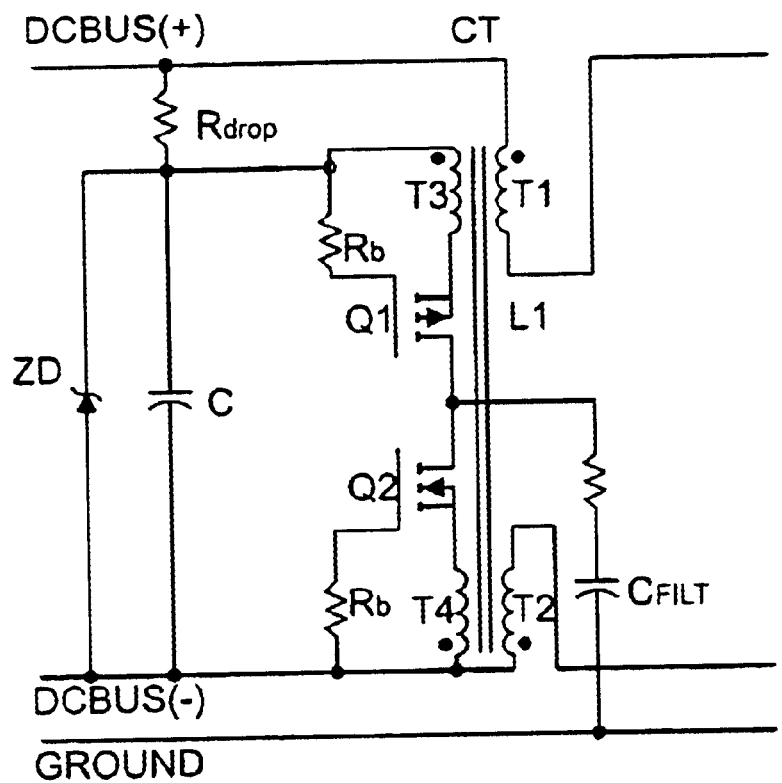
FIG. 16 is a circuit diagram like that of FIGS. 2, 3 and 4, but based on MOSFETs.

The bipolar transistors shown in FIG. 3 can be exchanged with appropriate N-channel and P-channel MOSFETs. FIG. 16 shows a circuit diagram based on MOSFETs. The basic operations and functions are the same. Each of the gate threshold voltages are generated according to current injected by the secondary winding. Therefore, it is advantageous in terms of initial biasing, which may be required if the circuit is based on a gate driven by the secondary winding.

In addition to complementary N and P channel devices, two N channel devices can be used, particularly because suitable N channel devices are more easily available than P channel devices. Also there would be an advantage in using N channel logic levels, which would not require a large common mode current sensor, because the secondary (gate) voltage would be lower. Two P channel device could also be used.

4. Simple Midpoint Control

Figure 13:
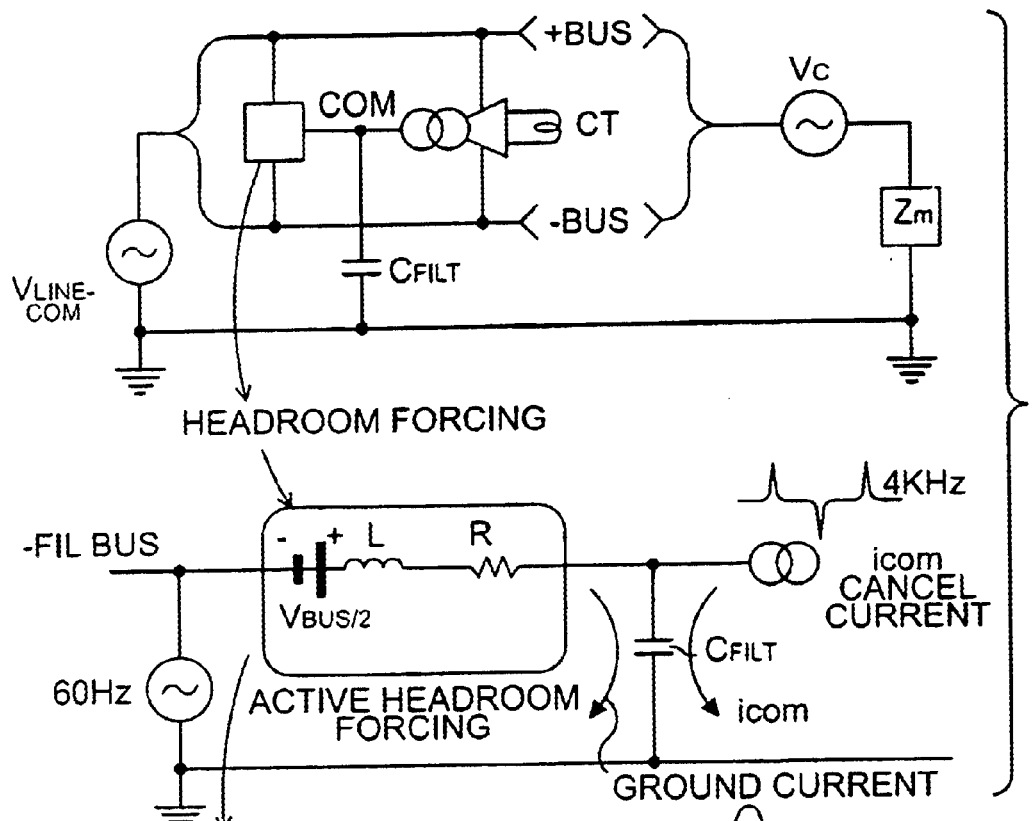
FIG. 13 shows a novel head-room control structure.
Figure 14:
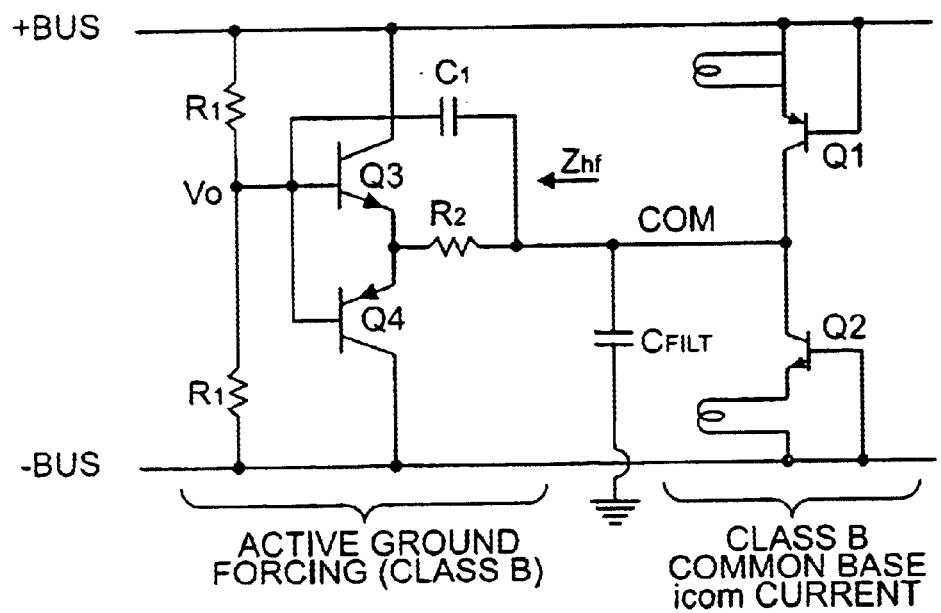
FIG. 14 shows a novel mid-point control for the circuit of FIG. 13.
Figure 15:
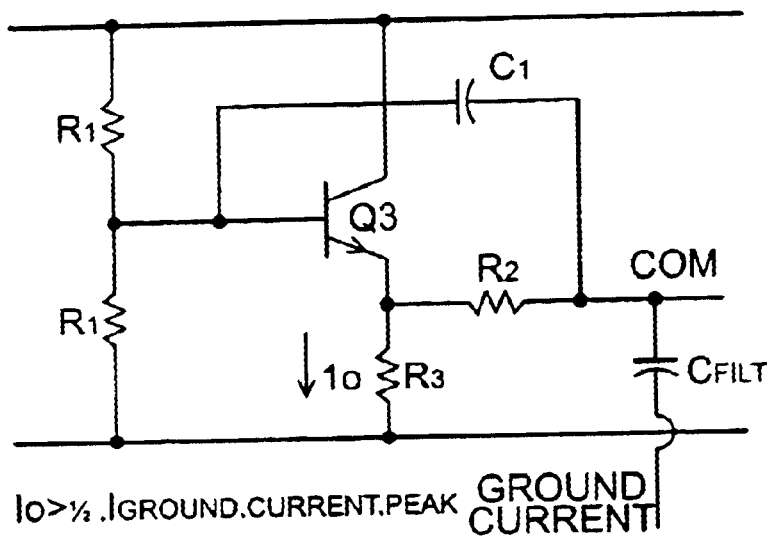
FIG. 15 shows a mid point control like that of FIG. 14, but using a class AB, common collector configuration.

Mid-point control (FIG. 13) is typically required for an active EMI filter so that each of the output transistors (Q1 and Q2 in FIG. 2) has enough voltage head room when required current flows into capacitor $C_{FILT}$ to the system ground node. FIG. 14 and FIG. 15 are simple discrete circuits for mid-point control. In FIG. 14, Q3 and Q4 are bipolar transistors which control the mid-point of the filter output. The basic circuit function is essentially the same as that of FIG. 13 where the series inductor and resistor are realized by equivalent active circuits based on two bipolar transistors (Q3 and Q4 in FIG. 14). Q1 and Q2 in FIG. 14 are configured as a common base active EMI filter as shown in FIG. 3.

In FIG. 14, the impedance Zhf of the midpoint control circuit is given by the following equation. $Zhf=R2+J\omega(R1/2\times R2\times C1)$. RI is much less than $R2\times h_{FE}$ of transistors Q1 and Q2. At a frequency of approximately 4 kHz, this equation shows that the input control circuit has high impedance. At a low frequency of, for example, 60 Hz the impedance is low.

FIG. 15 is another circuit for mid-point control which is based on a class AB common collector amplifier configuration. This circuit only requires one bipolar transistor Q3 as shown.

5. Simple Bias (Class AB) Structure for Performance Improvement

The presence of bias current often helps to improve the circuit response, particularly the initial stage of waveform tracking ability for an active EMI filter. Overall, it helps increase frequency response, thus enabling more effective EMI noise reduction at a higher frequency range of operation.

Figure 5:
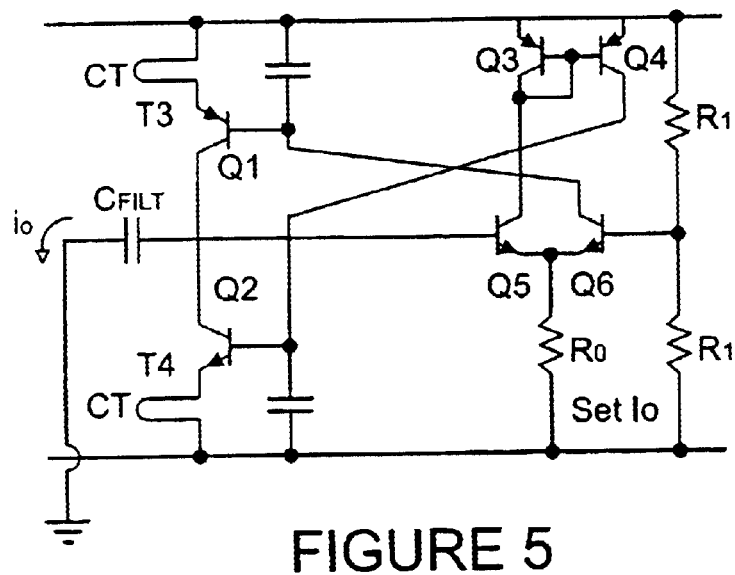
FIG. 5 shows a simple bias (class AB) structure.

FIG. 5 shows a simple class AB active EMI amplifier based on a common base configuration. Bias current can be set by the resistor Ro, based on the relation of ibias=*Io/hfe.

In FIG. 5, the transistors Q3 and Q4 operate as a current mirror. The current through transistor Q3 is mirrored in the transistor Q4 applied to the base of the transistor Q2 to control its bias current. Similarly, transistors Q5 and Q6 control the bias current applied to the base of the transistor Q1. The bias current applied to transistors Q1 and Q2 can be controlled by appropriately setting resistor $R_O$. Voltage divider resistors R1 provide a bias voltage to the base of transistor Q6 and hence set a mid point level at the common collectors of $Q_1$ and $Q_2$.

Figure 8:
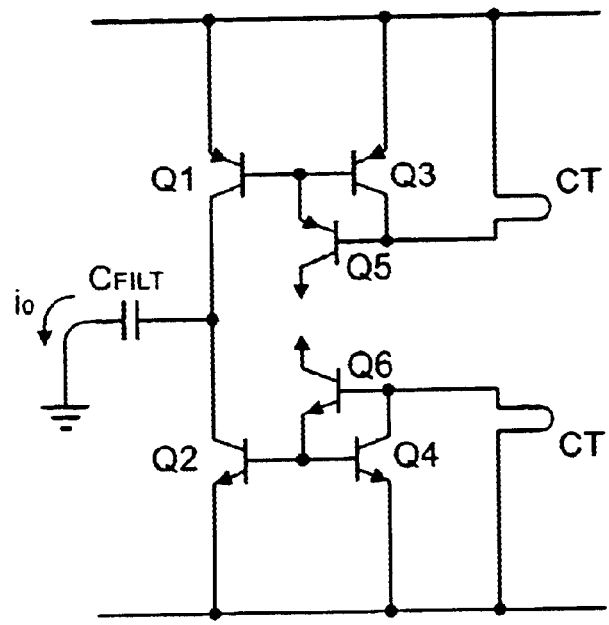
FIG. 8 shows a current mirror structure to increase the driving current of the active EMI filter in a class B amplifier system.

6. Current Boost Method and Frequency Compensation Method Based on Current Mirror Circuit and Cascode Circuit A current mirror circuit can be utilized to increase driving current of the active EMI filter. FIG. 8 shows a class B amplifier structure.

Figure 9:
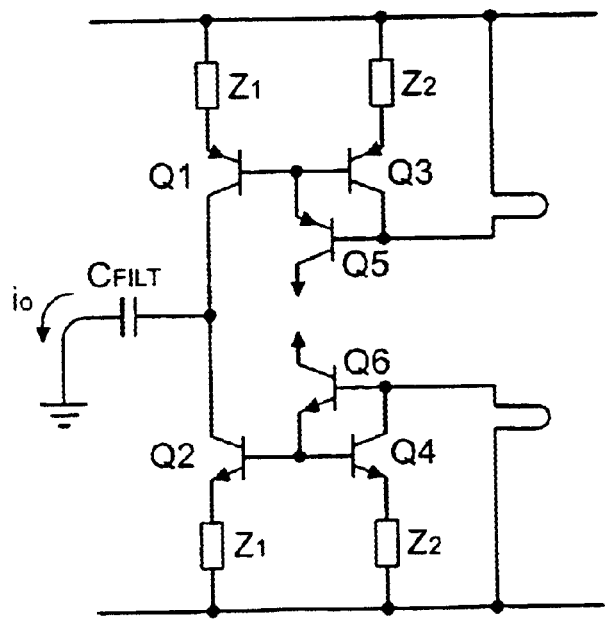
FIG. 9 shows the circuit of FIG. 8 with gain compensation for the current transformer frequency characteristics.
Figure 10:
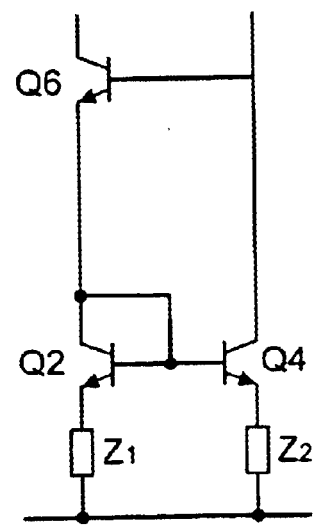
FIG. 10 shows a high speed current mirror circuit for the circuit of FIG. 9.

The circuit shown in FIG. 9 extends the ability to compensate the CT (current transformer) frequency characteristics in order to achieve a better overall frequency response and remove frequency limitations due to the CT core material. Q1 and Q2 should be properly selected in terms of frequency characteristics, and their associated gains are controlled by external resistors, Z1 and Z2. FIG. 10 shows another form of current mirror circuit, a high speed current mirror, which can be substituted for the current mirrors of FIG. 9.

Figure 11:
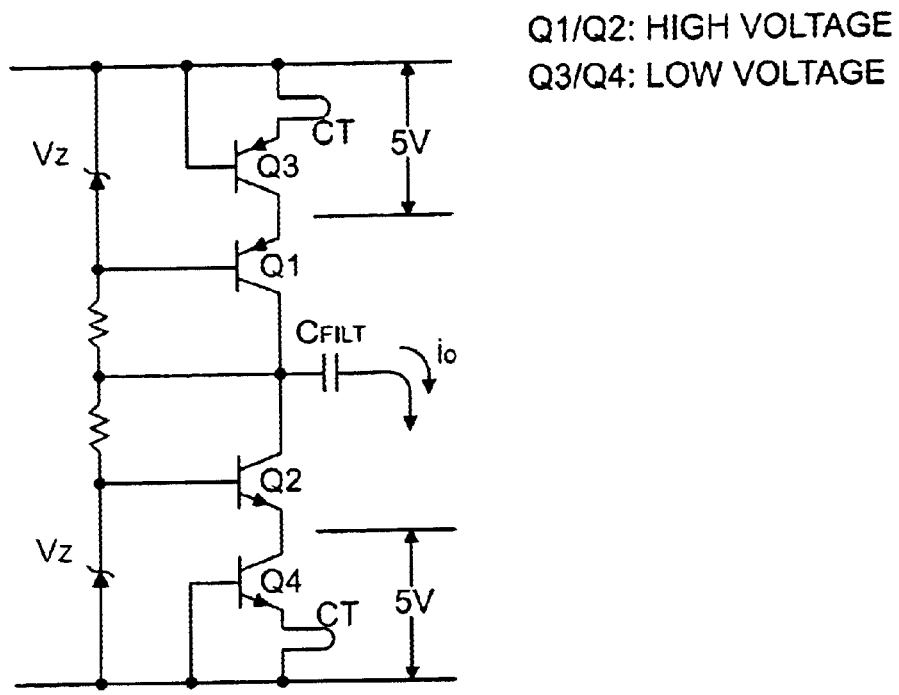
FIG. 11 shows a modification of the circuit of FIG. 8, with a cascode structure to improve frequency response.
Figure 12:
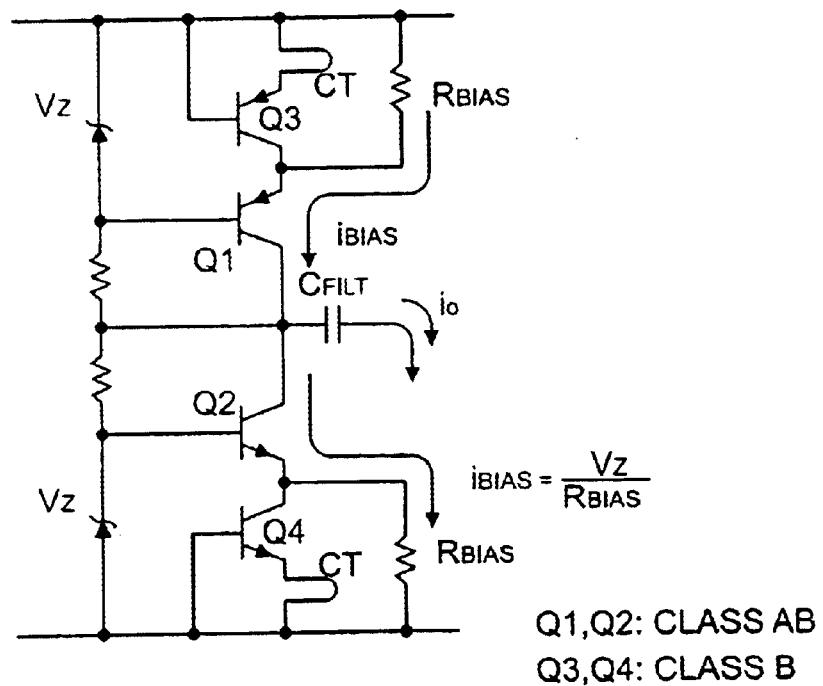
FIG. 12 is an improvement of the circuit of FIG. 11 in which bias capability is added.

Frequency response is also improved by introducing a cascode structure for the transistor connections which is shown in FIG. 111 and FIG. 12. The circuit of FIG. 12 has biasing capability in addition to the features of the circuit shown in FIG. 11.

7. N-Stage Multiple Pole Active EMI Filter

Figure 17:
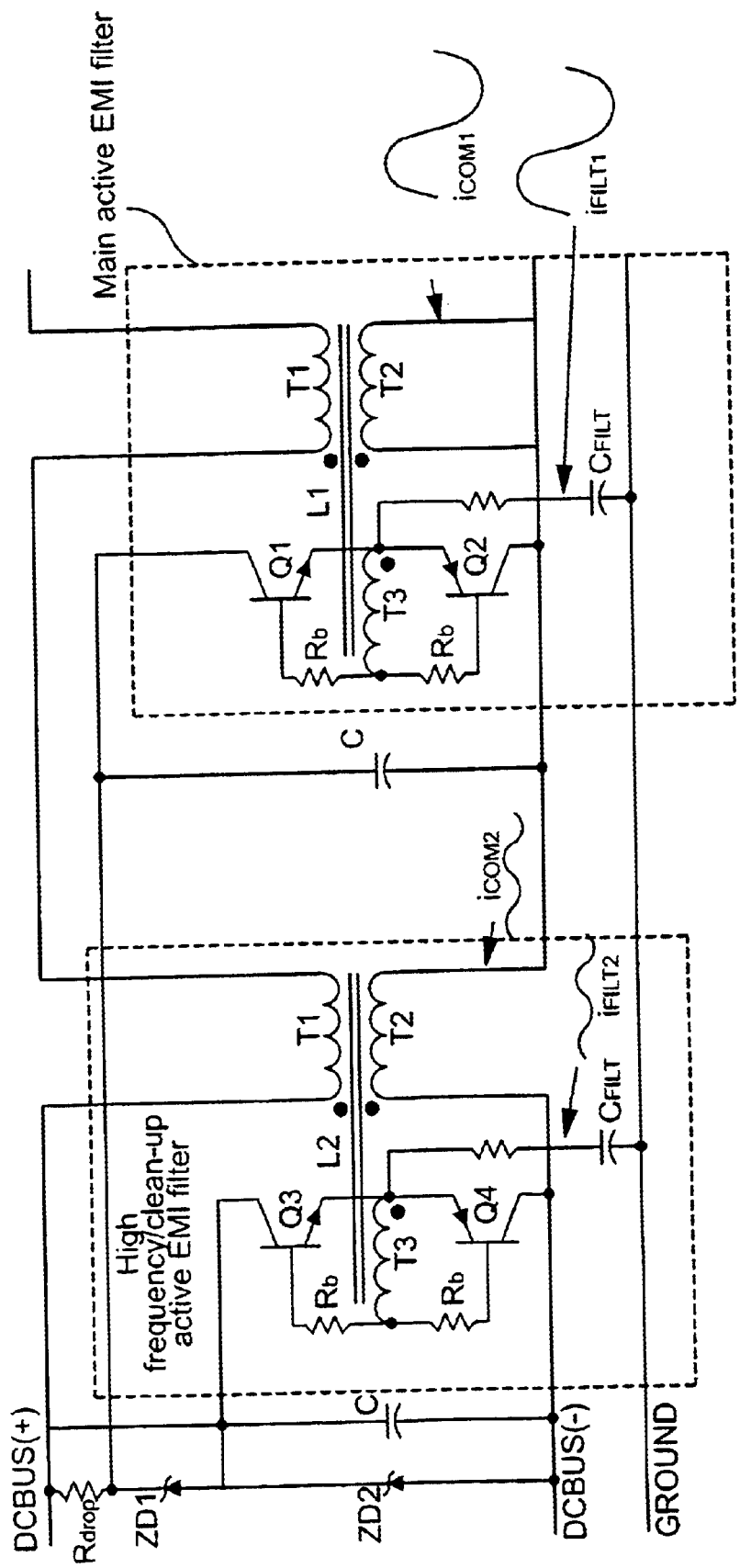
FIG. 17 shows an N-stage multiple pole active EMI filter.

The active EMI filter can be divided into N-stages. The advantage of this scheme is that the overall requirement of attenuation of the noise spectrum can be spread to multiple amplifier stages. FIG. 17 shows a two stage active EMI filter configuration. In FIG. 17, Q1 and Q2 achieve main cancellation with high current amplitude and with a relatively low frequency component, while Q3 and Q4 perform noise reduction at a higher frequency component; however, with relatively small amplitude. Since the headroom requirement is also different, it is possible to provide multiple-levels with a bus voltage for each amplifier. This is shown, for example, by the different voltage level provided to Q3 and Q4 by zener diodes ZD1 and ZD2 and resistor Rdrop.

Other features of the present invention include the integration of the ground fault detection circuits into a chip; and the production of an AC-AC simple active EMI filter.

Although the present invention has been described in relation to particular embodiments thereof, many other variations and modifications and other uses will become apparent to those skilled in the art. Therefore, the present invention should not be limited by the specific disclosure herein.

What is claimed is:

1. An active EMI filter for reducing common mode current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:

a transistor switching stage coupled across the DC bus;

a current sensor coupled to the DC bus for sensing the common mode current flowing in the DC bus and proportional to the common mode current flowing in the ground return line from or to the load;

the current sensor having inputs coupled to respective legs of the DC bus and an output driving the transistor switching stage, the transistor switching stage comprising two transistors driven by said output of the current sensor whereby one of said transistors is turned on by said current sensor output depending on the direction of common mode current in said DC bus;

a capacitor coupling said transistor switching stage and said ground return line and wherein said current sensor and said switching stage are coupled in a feed forward arrangement whereby the switching stage is coupled across said DC bus between said rectifier and said current sensor;

said capacitor providing a cancellation current to said ground return line from said transistor switching stage to substantially cancel the common mode current in the ground return line;

said transistor switching stage and said current sensor having an amplitude gain of approximately unity;

said current sensor comprising a current transformer having a primary connected in series with a respective leg of said DC bus;

said two transistors of said transistor switching stage comprising two complementary type transistors coupled such that a corresponding main electrode of each transistor are coupled together in a common connection, another corresponding main electrode of each transistor being coupled to a respective secondary of said current transformer and wherein the control electrodes of each of said transistors are coupled to respective legs of said DC bus.

2. The filter of claim 1, wherein the two transistors are bipolar transistors.

3. The filter of claim 1, wherein the two transistors are MOSFETs.

4. The active filter of claim 1, further comprising a voltage divider coupled across said DC bus coupled to the common connection of said transistors.

5. The active filter of claim 1, wherein two secondaries of said current transformer are coupled conductively to respective primaries of said current transformer.

6. The active filter of claim 1, further comprising a bias circuit for applying a respective bias current to the bases of said two transistors.

7. The active filter of claim 6, wherein the bias circuit comprises a current mirror circuit.

8. The active filter of claim 1, further wherein the two switching transistors are coupled to two respective additional transistors in a cascade arrangement.

9. The active filter of claim 1, further comprising an active headroom control circuit coupled to said switching transistor stage for ensuring a sufficient voltage level across the main electrodes of each of said transistors when current flows through said capacitor and through a respective one of said transistors.

10. The active filter of claim 9, further comprising a circuit for controlling a voltage level at said common connection of said transistors to a mid point of the voltage across said legs of said DC bus.

11. An active EMI filter for reducing common mode current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:

a transistor switching stage coupled across the DC bus;

a current sensor coupled to the DC bus for sensing the common mode current flowing in the DC bus and proportional to the common mode current flowing in the ground return line from or to the load;

the current sensor having inputs coupled to respective legs of the DC bus and an output driving the transistor switching stage, the transistor switching stage comprising two transistors driven by said output of the current sensor whereby one of said transistors is turned on by said current sensor output depending on the direction of common mode current in said DC bus;

a capacitor coupling said transistor switching stage and said ground return line and wherein said current sensor and said switching stage are coupled in a feed forward arrangement whereby the switching stage is coupled across said DC bus between said rectifier and said current sensor;

said capacitor providing a cancellation current to said ground return line from said transistor switching stage to substantially cancel the common mode current in said ground return line;

said transistor switching stage and said current sensor having an amplitude gain of approximately unity;

said current sensor comprising a current transformer having a primary connected in series with a respective leg of said DC bus;

said two transistors of said transistor switching stage comprising two transistors of the same type coupled such that a main electrode paths through said two transistors are in series with each other and in series with a respective secondary of said current transformer, a control electrode of each transistor being coupled to a respective secondary of said current transformer.

12. The active filter of claim 11, wherein the two transistors comprise NPN transistors.

13. The active filter of claim 11, wherein the two transistors comprise PNP transistors.

14. The active filter of claim 11, wherein the two transistors are arranged in a common emitter amplifier connection.

15. The active filter of claim 11, wherein the two transistors are arranged in a common collector amplifier connection.

16. The active filter of claim 11, further comprising a current mirror circuit for providing a bias current to the control electrode of each transistor.

17. The active filter of claim 11, further comprising a second active filter arranged in series with said active filter, each active filter being configured to filter a different frequency range of said common mode current.

18. An active EMI filter for reducing common mode current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:

a transistor switching stage coupled across the DC bus;

a current sensor coupled to the DC bus for sensing the common mode current flowing in the DC bus and proportional to the common mode current flowing in the ground return line from or to the load;

the current sensor having inputs coupled to respective legs of the DC bus and an output driving the transistor switching stage, the transistor switching stage comprising two transistors driven by said output of the current sensor whereby one of said transistors is turned on by said current sensor output depending on the direction of common mode current in said DC bus;

a capacitor coupling said transistor switching stage and said ground return line and wherein said current sensor and said switching stage are coupled in a feed forward arrangement whereby the switching stage is coupled across said DC bus between said rectifier and said current sensor;

said capacitor providing a cancellation current to said ground return line from said transistor switching stage to substantially cancel the common mode current in said ground return line;

said transistor switching stage and said current sensor having an amplitude gain of approximately unity;

said current sensor comprising a current transformer having a primary connected in series with a respective leg of said DC bus;

said two transistors of said transistor switching stage comprising two transistors coupled such that a corresponding main electrode of each transistor are coupled together in a common connection, with another corresponding main electrode of each transistor being coupled to a respective secondary of said current transformer and wherein said two transistors comprise bipolar transistors coupled such that the collectors of said transistors are coupled together, the emitters are coupled to a respective secondary of said current transformer and the bases of said transistors are coupled to respective legs of said DC bus whereby said transistors are coupled in a common base amplifier connection.

19. An active EMI filter for reducing common mode current in a circuit comprising a rectifier coupled to an AC network, the rectifier supplying DC power to a DC bus, the DC bus feeding an inverter stage for providing AC power to a load, the load having a ground return line to a ground connection of the AC network, the active filter comprising:

a transistor switching stage coupled across the DC bus;

a current sensor coupled to the DC bus for sensing the common mode current flowing in the DC bus and proportional to the common mode current flowing in the ground return line from or to the load;

the current sensor having inputs coupled to respective legs of the DC bus and an output driving the transistor switching stage, the transistor switching stage comprising two transistors driven by said output of the current sensor whereby one of said transistors is turned on by said current sensor output depending on the direction of common mode current in said DC bus;

a capacitor coupling said transistor switching stage and said ground return line and wherein said current sensor and said switching stage are coupled in a feed forward arrangement whereby the switching stage is coupled across said DC bus between said rectifier and said current sensor;

said capacitor providing a cancellation current to said ground return line from said transistor switching stage to substantially cancel the common mode current in said ground return line;

said transistor switching stage and said current sensor having an amplitude gain of approximately unity;

said current sensor comprising a current transformer having a primary connected in series with a respective leg of said DC bus;

said two transistors of said transistor switching stage comprising two MOSFETS coupled such that a corresponding main electrode of each transistor are coupled together in a common connection, another corresponding main electrode of each transistor being coupled to a respective secondary of said current transformer and wherein the control electrodes of said transistors are coupled to respective legs of said DC bus.

* * * * *